(12) United States Patent
Liu

(10) Patent No.: US 7,283,752 B2
(45) Date of Patent: Oct. 16, 2007

(54) METHOD AND APPARATUS FOR PMD/PDL/PDG MITIGATION

(75) Inventor: Xiang Liu, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 633 days.

(21) Appl. No.: 10/813,960

(22) Filed: Mar. 31, 2004

(65) Prior Publication Data

US 2005/0226633 A1      Oct. 13, 2005

(51) Int. Cl.
*H04B 10/00* (2006.01)
(52) U.S. Cl. ............... 398/152; 398/147; 398/158
(58) Field of Classification Search ........ 336/152; 398/152
See application file for complete search history.

(56) References Cited

U.S. PATENT DOCUMENTS

| | | | |
|---|---|---|---|
| 5,841,557 A * | 11/1998 | Otsuka et al. ............... | 398/65 |
| 6,437,892 B1 | 8/2002 | Fang et al. | |
| 6,847,743 B2 * | 1/2005 | Yamaguchi ............... | 385/11 |
| 6,889,011 B1 * | 5/2005 | Fee et al. ............... | 398/148 |
| 7,095,912 B1 * | 8/2006 | Frigo et al. ............... | 385/11 |
| 7,106,970 B2 * | 9/2006 | Fujiwara et al. ............ | 398/81 |
| 2004/0202480 A1 * | 10/2004 | Weid et al. ................ | 398/147 |

OTHER PUBLICATIONS

Liu et al., "Multichannel PMD Mitigation Through Forward-Error-Correction With Distributed Fast PMD Scrambling", *Optical Fiber Communication Conference 2004, OFC 2004*, vol. 1, Feb. 23, 2004, pp. 1-3.
Li et al., "Experimental Evaluation Of The Effect Of Polarization Scrambling Speed On The Performance Of PMD Mitigation Using FEC", *Optical Fiber Communication Conference Technical Digest Series*, Washington, DC, Feb. 23, 2004, pp. 1-3.
Wedding et al., "Enhanced PMD Mitigation By Polarization Scrambling And Forward Error Correction", *Optical Fiber Communication Conference (OFC) Technical Digest Postconference Edition*, Anaheim, CA, Mar. 17-22, 2001, Trends In Optics and Photonics Series, vol. 54, pp. WAA1-1-WAA1-3.
Haunstein et al., "BER Measurements Of A 40 GB/s Receiver With Adaptive Threshold Using Polarization Scrambling", Holey Fibers And Photonic Crystals/Polarization Mode Dispersion/Photonics Time/Frequency Measurement And Control, *2003 Digest Of The LEOS Summer Topical Meetings*, Jul. 14-16, 2003, pp. 17-18.

* cited by examiner

*Primary Examiner*—Kenneth Vanderpuye
*Assistant Examiner*—Thi Q. Le

(57) ABSTRACT

An optical communication method and apparatus are provided, the apparatus including polarization controllers, and drive circuitry for driving the polarization controllers at a plurality of frequencies such that the penalties from PMD, PDL and PDG are mitigated.

29 Claims, 11 Drawing Sheets

METHOD AND APPARATUS FOR PMD/PDL/PDG MITIGATION

CROSS-REFERENCE TO RELATED APPLICATION

This application is related to U.S. patent applications entitled "System And Method For Multi-Channel Mitigation of PMD/PDL/PDG" filed on Jul. 31, 2003 and Aug. 31, 2003, which are incorporated herein by reference.

FIELD OF THE INVENTION

The present invention relates to optical communications, and more specifically to polarization scrambling methods and apparatus for mitigation of polarization-mode-dispersion (PMD), polarization-dependent loss (PDL), and polarization-dependent gain (PDG) penalties in optical communication systems.

BACKGROUND OF THE INVENTION

PMD, PDL, and PDG are significant penalty sources in high-speed (e.g., 10 Gb/s and 40 Gb/s) transmissions. PMD compensation (PMDC) is normally desirable to increase system tolerance to PMD. However, due to the stochastic nature of PMD and its wavelength dependence, PMDC is normally implemented for each wavelength channel individually, and is thus, generally not cost-effective. Various prior art methods have been proposed to achieve PMDC simultaneously for multiple WDM channels. Channel switching is one technique that has been proposed to mitigate the overall PMD penalty in a WDM system. However, such systems sacrifice system capacity due to the use of extra channels for PMD protection. Multi-channel PMDC before wavelength de-multiplexing has also been proposed to compensate for the PMD degradation in the WDM channel having the most severe PMD. However, such a mitigation scheme may cause degradation of other channels.

Another scheme for a multi-channel shared PMDC has been proposed in which the most degraded channel is switched, by optical or electrical means, to a path connected to the shared PMDC. However, the speed of such a PMDC solution is limited by the speed of the optical or electrical switching.

In each of the prior art PMDC schemes discussed above, undesirable PMD induced system outages (during which the PMD penalty exceeds its pre-allocated system margin) are present, though reduced.

Forward-error-correction (FEC) is an effective technique for increasing system margin cost-effectively. It has been determined, however, that FEC cannot extend the tolerable PMD for a fixed PMD penalty at a given average bit-error-rate (BER), even though the additional margin provided by FEC can be used to increase the PMD tolerance. It has been suggested that sufficient interleaving in FEC may increase PMD tolerance. However, there is no known practical method to provide the deep interleaving needed to avoid a PMD outage, which may last minutes or longer in practical systems.

Although distributed polarization scrambling has been proposed as an effective technique for mitigation of PMD/PDL/PDG penalties, a need exists for optimized and cost effective designs for providing polarization scrambling to mitigate PMD/PDL/PDG.

SUMMARY OF THE INVENTION

The present invention provides a polarization scrambling method and apparatus for multi-channel PMD/PDL/PDG mitigation.

According to one embodiment, the present invention a polarization scrambler apparatus is provided for use in nodes of an optical communication system. The apparatus comprises M polarization controllers and drive circuitry adapted to drive the M polarization controllers at at least one of a plurality of frequencies $f_1 \ldots f_M$, wherein $f_1 \geq f_2 \ldots \geq f_M$, and $f_1 \geq$ about $BR/(BECL \times N)$. BR is the highest bit rate of the optical signal, BECL is a maximum burst error correction length of forward error correction used in the optical communication system and N is the number of nodes having one or more polarization controllers.

According to another embodiment, an optical communications method is provided for use in at least one of N nodes of an optical communication system. The method comprises driving M polarization controllers at at least one of a plurality of frequencies $f_1$-$f_M$ such that $f_1 \geq f_2 \ldots \geq f_M$; and $f_1 \geq$ about $BR/(BECL \times N)$. BR is the highest bit rate of the optical signal being transmitted, and BECL is a maximum burst error correction length of forward error correction used in the optical communication system.

BRIEF DESCRIPTION OF THE DRAWING

The foregoing and other objects, features and advantages of the present invention will become more apparent from the following detailed description when taken in conjunction with the appended drawings.

It is to be noted, however, that the appended drawings illustrate only exemplary embodiments of the invention and are therefore not to be considered limiting of the scope of the invention.

DETAILED DESCRIPTION OF THE INVENTION

In one aspect of the present invention methods and apparatus are employed to provide polarization scrambling (for use in conjunction with FEC) to change the polarization of a signal between at least two states during each burst-error-correcting period (BECP) of the FEC. By changing polarization at least once during each BECP the PMD experienced by a signal is varied during each BECP, and the PMD induced "outages" are effectively limited to last for a period that is shorter than the correcting period simultaneously for all wavelength channels. The FEC can then effectively correct the dominating errors that occur and thereby improve system tolerance to PMD and prevent system outages. (BECP is in units of time, which equals burst error correction length (BECL) multiplied by the bit period. For the ITU standard G.709, the BECL=1024 bits. Thus, in a G.709 standardized 10.7-Gb/s system, the BECP is approximately 1024×100 ps≈0.1 μs.)

Figure 1A:
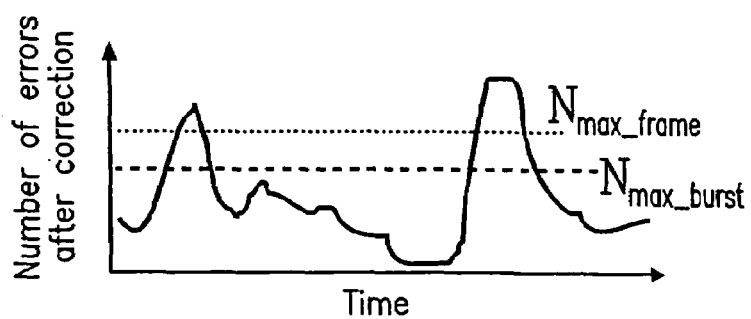
FIGS. 1A-D are plots illustrating a working principle of embodiments of the present invention.
Figure 1B:
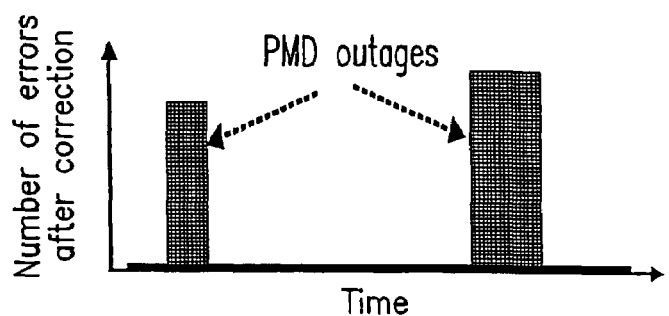

FIGS. 1A-D illustrate a working principle of present invention. FIGS. 1A-B show the case without polarization scrambler modules (PSMs). As shown in FIGS. 1A-B, PMD occasionally causes severe signal waveform distortion, which results in consecutive or very frequent errors. Such PMD-induced distortion typically last from milliseconds up to minutes.

For any given FEC code, there is a maximum number of correctable errors per FEC frame (or block), $N_{max\_frame}$. There is also a maximum number of correctable consecutive burst errors per FEC frame, $N_{max\_burst}$, (which is referred to herein as the BECL, and is generally less or equal to $N_{max\_frame}$). FEC is unable to correct the errors (and may even generate more errors) when the errors occur so frequently that during each FEC frame period (normally on the order of microseconds) the number of errors exceeds $N_{max\_frame}$, or occur consecutively for more than $N_{max\_burst}$ times. These events, during which a system fails (even with an allocated margin) because of PMD, are called PMD-induced outage events, and are illustrated in FIG. 1B.

Figure 1C:
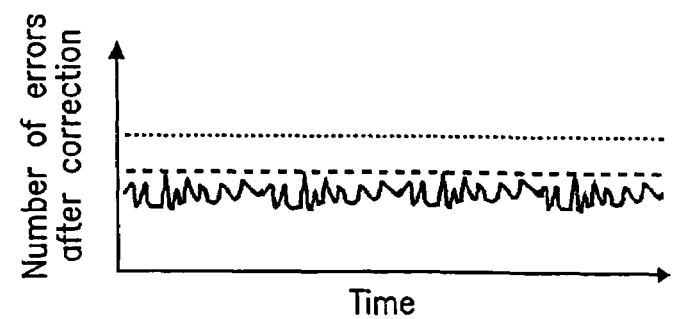
Figure 1D:
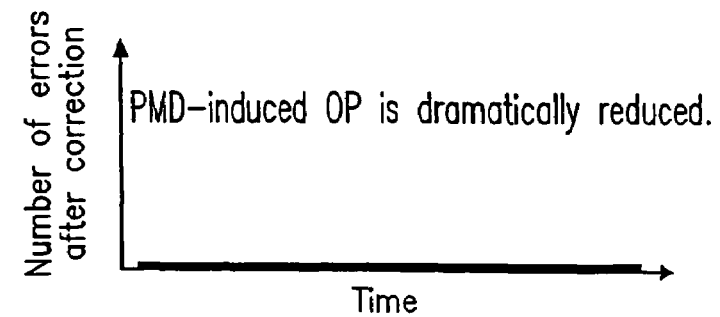

Using PSMs, in accordance with aspects of the present invention, to scramble the PMD (experienced by a signal during transmission) during each FEC frame, redistributes the PMD to close to its original Maxwellian distribution, such that no consecutive errors (due to PMD) last longer than $N_{max\_burst}$, as shown in FIG. 1C. By doing so, the errors are substantially uniformly distributed when looking at a time resolution of an FEC frame period, and can thus be effectively corrected by FEC, providing an appropriate system margin is allocated for PMD. It can be understood that the total number of errors (before FEC correction) over an infinite time period will be the same for the two cases without and with PSMs. The redistribution of the PMD effectively enables FEC to correct errors during what would otherwise be a PMD outage event, so the PMD induced OP is substantially reduced, as shown in FIG. 1B.

Figure 2:
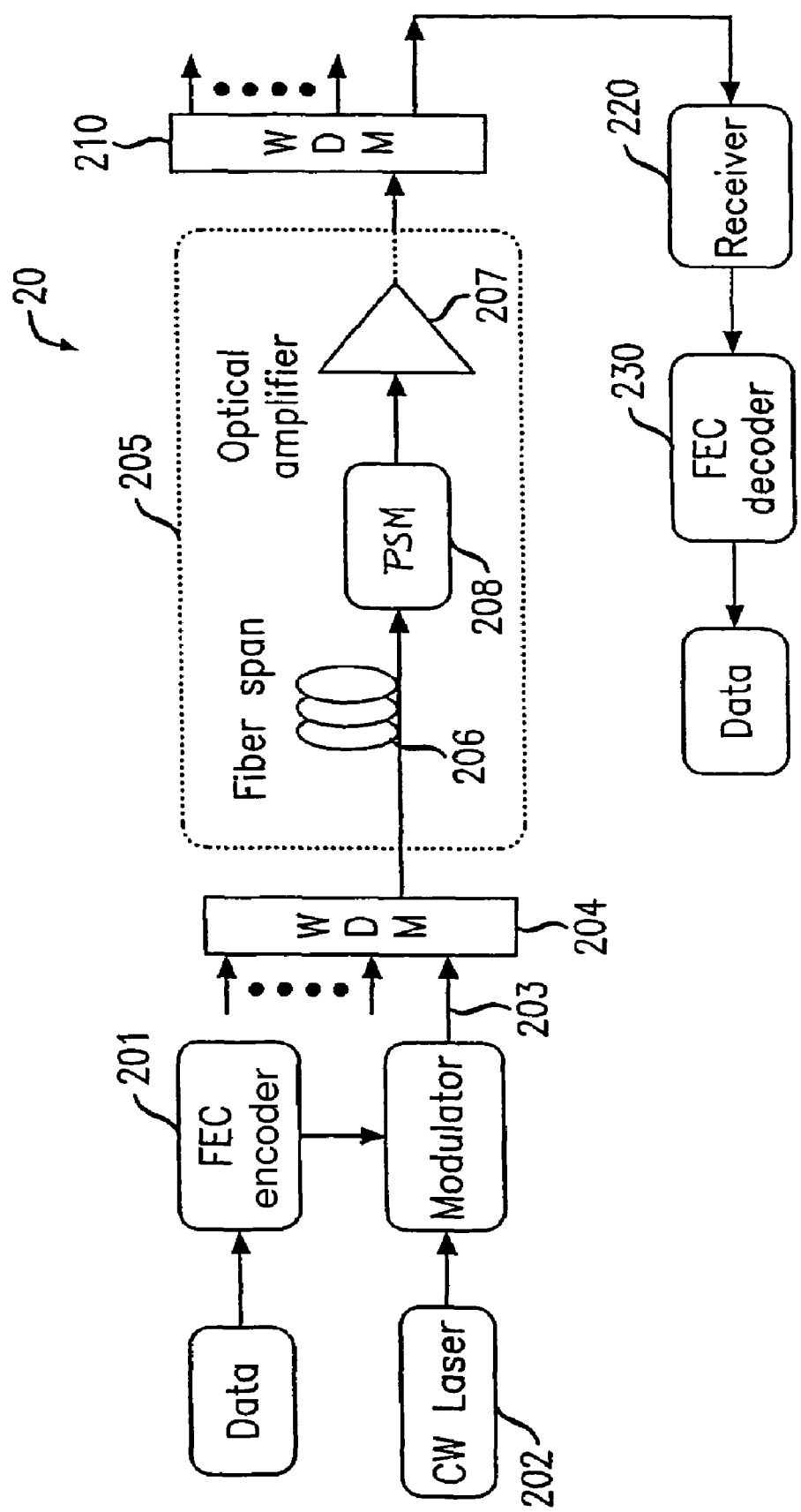
FIG. 2 is a diagram depicting one embodiment of a system according to the invention.

One embodiment of a system 20 in accordance with the invention is shown in FIG. 2. In operation, a high-speed signal (e.g., OC192) is first FEC encoded by an FEC encoder 201, and then used to modulate light from a light source 202, forming one wavelength channel 203 of an optical signal. A plurality of such channels are similarly encoded and are multiplexed in a wavelength-division-multiplexer (WDM) 204 to form an optical signal for transmission across a link. The link comprises one or more transmission spans 205. The transmission spans 205 preferably comprise one or more transmission fiber spans 206, one or more optical amplifiers 207 (e.g., EDFAs), and, if necessary, dispersion compensating modules (DCMs, not shown).

In the embodiment shown in FIG. 2, a polarization scrambler module (PSM) 208 is positioned within the span 205. It can be understood by those skilled in the art that one or more PSMs 208 can be distributed along a link. (e.g., one or more PSMs can be added in one or more amplified spans).

Figure 3:
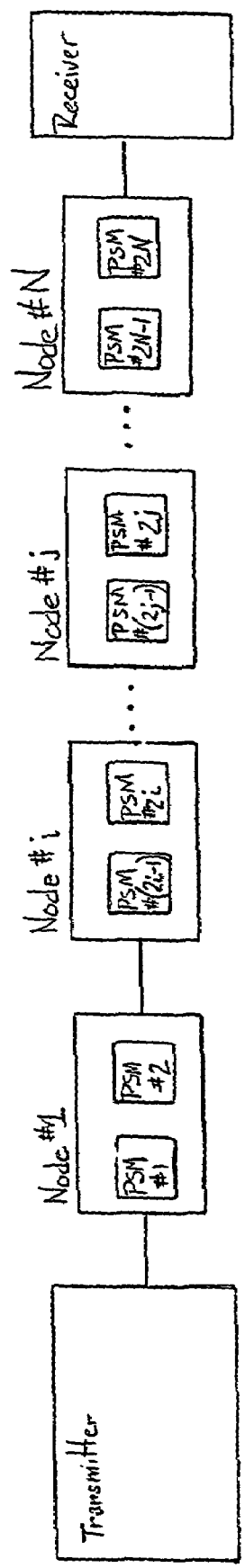
FIG. 3 is a diagram depicting another embodiment of a system according to the invention.

Another embodiment of a system employing FEC encoding (using 2 PSMs per node in a system with N nodes) in accordance with the invention is shown in FIG. 3. As used herein, the term 'node" refers to any point in a system or network having one or more PSMs. The two PSMs of each node are preferably driven at two different frequencies (as discussed further below).

Figure 4:
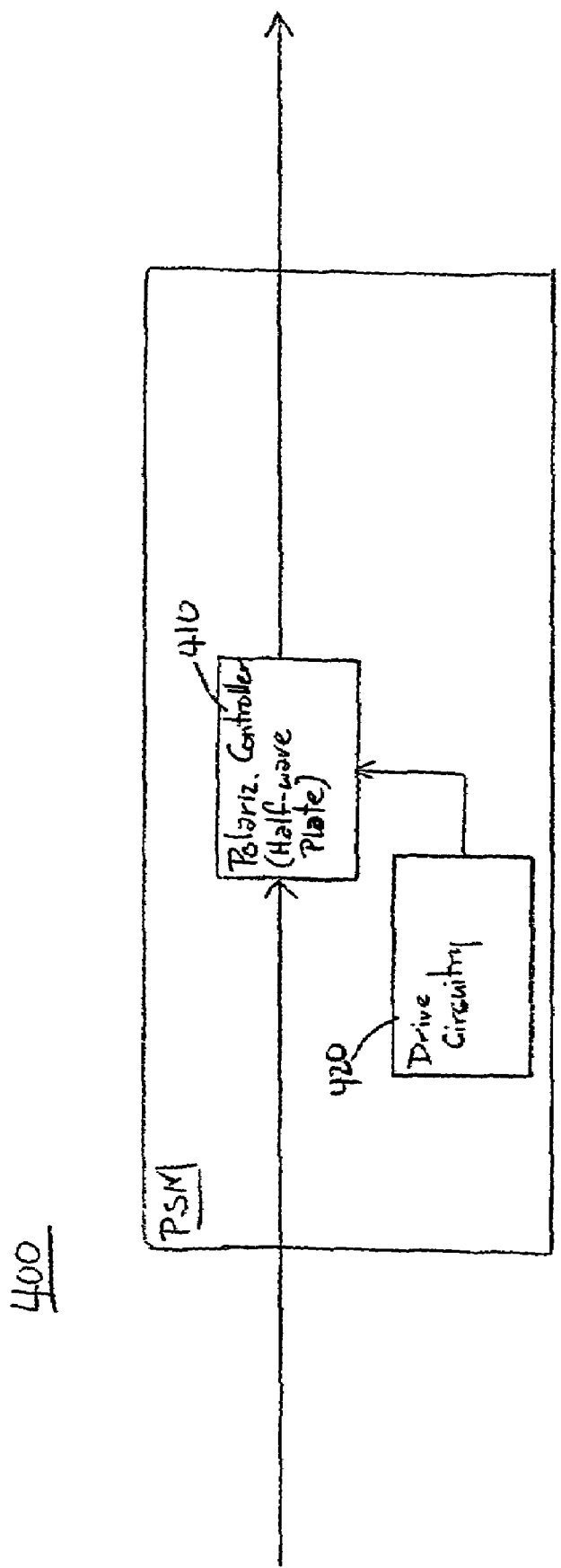
FIG. 4 is a diagram of an embodiment of a polarization scrambler module according to the invention.

One embodiment of a PSM 400 in accordance with the present invention is shown in FIG. 4. As shown in FIG. 4, the PSM 400 may comprise a rotatable half-wave plate device 410 and drive circuitry 420. As can be understood by those skilled in the art the rotatable half-wave plate device 410 effectively serves as a polarization varying device or polarization controller. Alternatively, other devices may be used to vary or control the polarization of transmitted optical signals, including phase modulators, rotatable quarter-wave plates, and the like. As used herein, 'polarization controller' refers to any type of polarization varying device, including but not limited to those discussed above.

Figure 5:
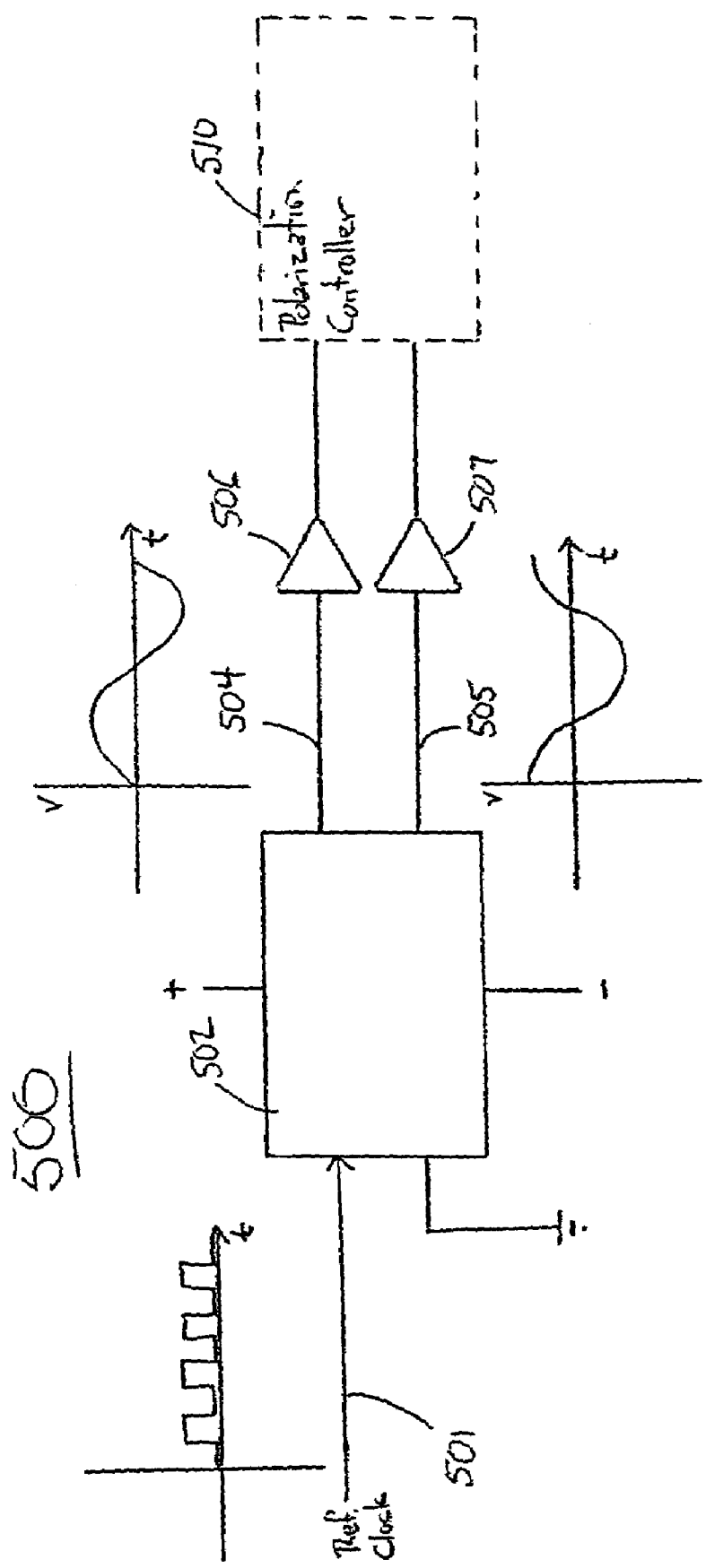
FIG. 5 is a diagram showing an embodiment of drive circuitry that can be used in accordance with the invention.

FIG. 5 is a diagram showing one embodiment of drive circuitry 500 which can be used in accordance with embodiments of the invention. As can be understood from FIG. 5, a reference clock signal 501 is input into a processor 502 to generate substantially sinusoidal RF drive signals 504, 505. The processor 502 can be an integrated circuit, or any other device capable of generating one or more drive signals 504, 505.

The drive signals 504, 505 preferably have the same frequency and may have a variable delay with respect to each other. The drive signals 504, 505 can be used to drive polarization controllers in accordance with the invention.

Optical amplifiers 506, 507 may be used to amplify the drive signals 504, 505 before driving a polarization controller 510 (shown in phantom). It is understood that the drive circuitry 500 may be integrated with the polarization controller 510, or may be a separate device/component.

Additionally, those skilled in the art can appreciate that the drive circuitry 500 can be arranged to generate a single sinusoidal drive signal to drive a phase modulator based polarization controller device in accordance with alternate embodiments of the invention discussed herein.

Referring again to FIG. 2, the PSMs 208 are preferably positioned along a link where the signal power is relatively high (e.g., after an optical amplifier) so that the OSNR degradation due to the loss from the PSMs is substantially minimized. It is also preferred that the PSMs 208 are substantially uniformly distributed along the link (e.g., spaced along the link based on PMD values of the spans within the link) so that the PMD is more effectively redistributed.

The PSM 208 can comprise, for example, a single-stage $LiNbO_3$ based phase modulator, or any other device that provides sufficient polarization scrambling. Preferably, at least two PSMs are driven at different frequencies (that are "relatively prime" to each other), and are used together in a given node to randomize signal polarization, independent of the polarization state of the input signal. "Relatively prime" as used herein refers to being relatively prime (i.e. they have no factors in common except for 1) with respect to the first two significant digits (after rounding) of the higher frequency. For example, 10.9 MHz and 8.2 MHz are considered herein to be relatively prime after rounding since 10.9 becomes 11 and 8.2 becomes 8, and 11 and 8 are relatively prime. As an additional example 15.2 and 30.1 are not considered relatively prime since after rounding 15 and 30 are not relatively prime.

At the receiver side of the system 20, WDM channels of the transmitted optical signal are de-multiplexed by demultiplexer 210 and then individually detected at a receiver 220. The signals are then FEC decoded with an FEC decoder 230 to obtain the original data signal.

Figure 6A:
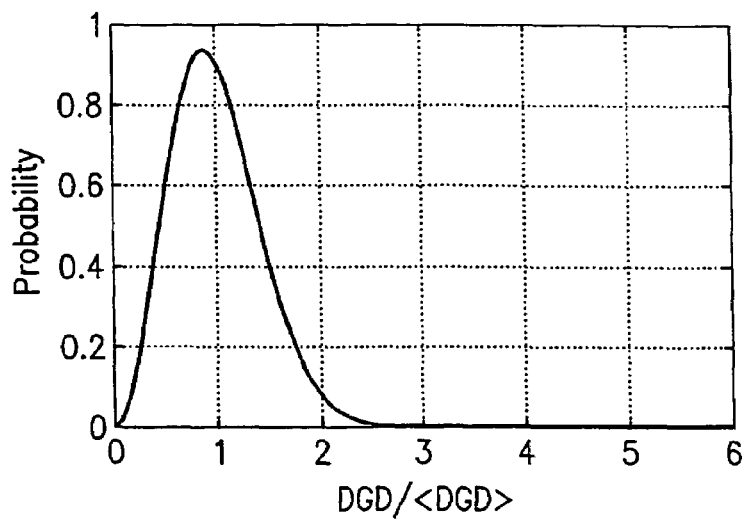
FIGS. 6A-D are plots showing the Maxwellian distribution of a link differential-group-delay (DGD); the link DGD distributions during an outage event with one polarization scrambler module (PSM) in the middle of the link; and the DGD distributions of the first and second half of the link during the outage, respectively.

The instant PMD of a link can be represented by a vector, $\Omega$, whose length equals the DGD between two principle states of polarization (PSPs) of the fiber link, and whose direction is aligned with the maximum delay PSP. Generally, the distribution of DGD follows Maxwellian distribution, as shown in the plot of FIG. 6A. At some rare occasions (toward the tail of the Maxwellian distribution), instant $|\Omega|$ can be much larger than the average link DGD, $\overline{\Omega}$ (or DGD), resulting in a large penalty. Outage probability (OP) is commonly used to assess the probability of having a PMD penalty larger than a pre-allocated amount (e.g., 2 dB in required OSNR). It is desirable to have the OP as small as possible.

Figure 6B:
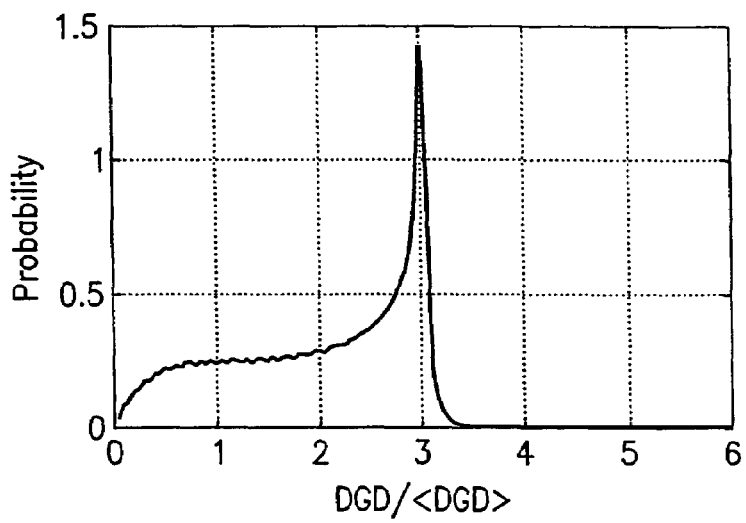
Figure 6C:
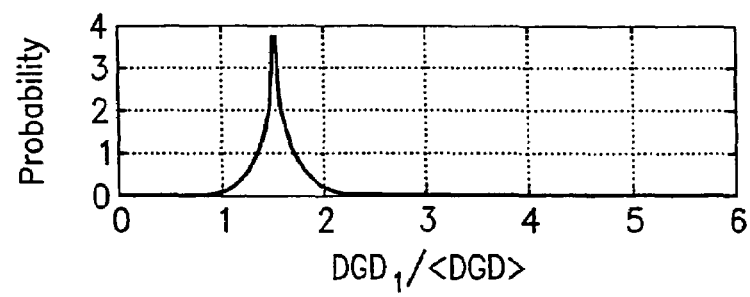
Figure 6D:
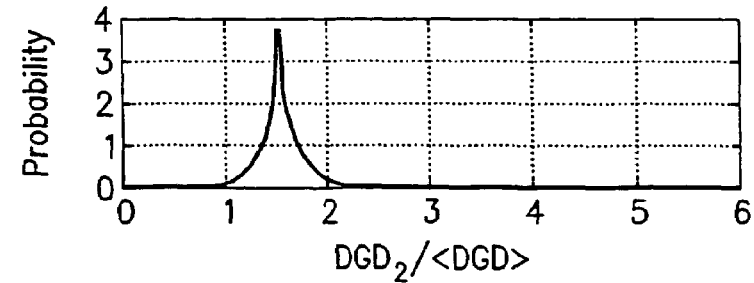

Numerical simulations have shown that OP can be reduced using distributed PSMs in accordance with embodiments of the invention. As illustrated in FIG. 6B, given an outage event during which the instant $|\Omega_0|=3\overline{\Omega}$, $|\Omega|$ is redistributed by inserting a PSM at the middle of the link. The new distribution is obtained as follows. We first find all the possible pairs of PMD vectors of the first and second half of the link, $\Omega_1$ and $\Omega_2$, that satisfy $\Omega_1+\Omega_2=\Omega$, and their occurrence probabilities. The distributions of $|\Omega_1|$ and $|\Omega_2|$ are shown in FIGS. 6C-D. For each ($\Omega_1$, $\Omega_2$) pair, we rotate $\Omega_1$ on the Poincare sphere with all possible states uniformly sampled (to emulate the function of the PSM), and sum it with $\Omega_2$ to obtain a new PMD vector, $\Omega_{new}$. The distribution of $|\Omega_{new}|$ is then obtained by calculating the relative probabilities of all the sampled DGD values and re-normalizing them. Clearly, the new distribution is no longer isolated around $3\overline{\Omega}$, but has a substantial portion around $\overline{\Omega}$.

Figure 7A:
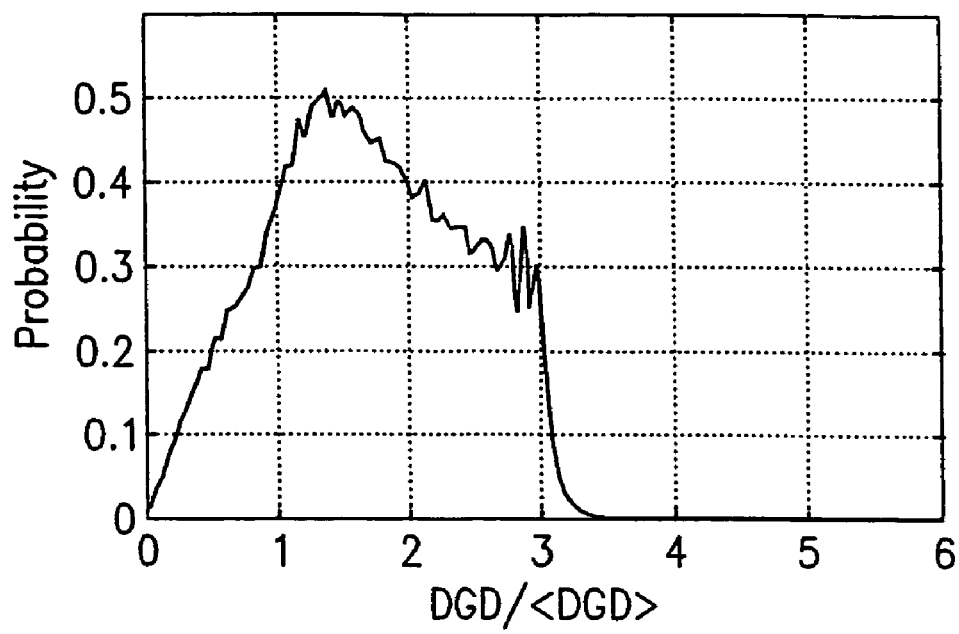
FIGS. 7A-B are plots showing the distribution of the link DGD distributions during an outage with 2 and 6 PSMs, respectively.
Figure 7B:
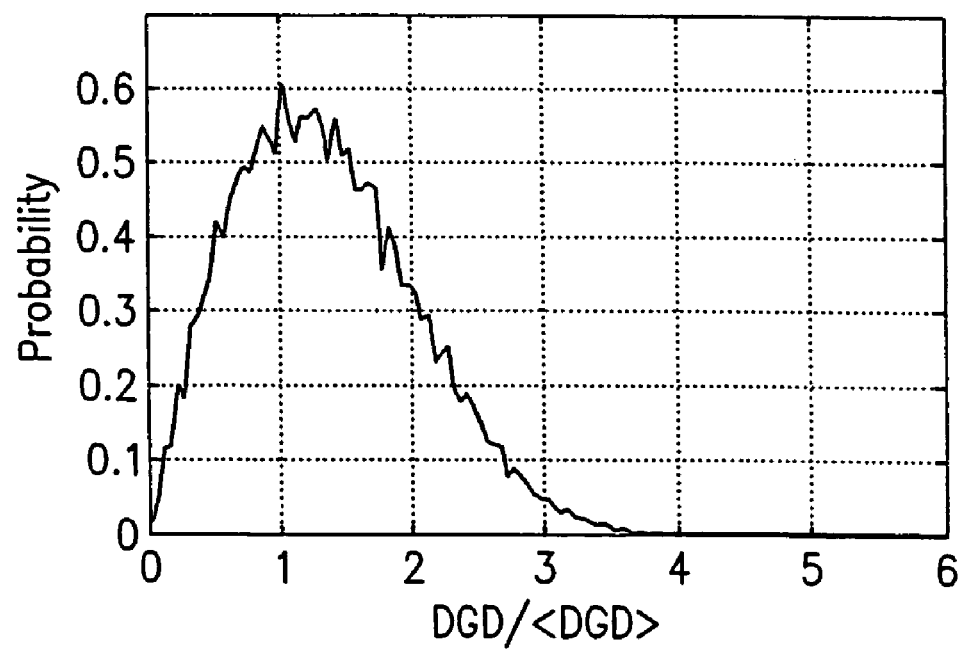

The above process was repeated for cases with 2 or more distributed PSMs 208. FIGS. 7A-B show the new DGD distribution with 2 and 6 uniformly distributed PSMs, respectively. With an increased number of PSMs 208, the DGD distribution becomes closer to the original Maxwellian distribution. It can be appreciated by those skilled in the art that the DGD distribution of the i-th section, $|\Omega_i|$, is likely to be distributed around $|\Omega|/(N+1)$ (N being the total number of PSMs) providing that $|\Omega|/(N+1)>\overline{\Omega}/(N+1)^{1/2}$, since the Maxwellian distribution strongly favors that $|\Omega_i|$ be close to $\overline{\Omega}/(N+1)^{1/2}$. With distributed polarization scrambling, the new $\Omega$ can be seen as the quadratic summation of all the sectional PMD vectors, and its mean value can be approximated as $$\overline{\Omega}_{new} \approx \max(\overline{\Omega}, |\Omega_0|/\sqrt{N+1}). \qquad (1)$$

As N becomes sufficiently large, the new mean PMD approaches $\overline{\Omega}$. This qualitatively explains the convergence of the new link DGD distribution from an outage event to its original Maxwellian distribution through the use of distributed PSMs.

PSM Speed Requirement for Outage Prevention

To effectively redistribute the link DGD during an outage event to the original Maxwellian distribution, the speed requirement of PSMs 208 (which is closely related to the FEC code used and the system data rate) is an important parameter. Generally, an FEC code is capable of correcting $N_{max\_frame}$ maximum number of errors per FEC frame, and $N_{max\_burst}$ maximum number of consecutive burst errors. RS-FEC has an advantageous feature that $N_{max\_burst}$ equals $N_{max\_frame}$. In one version of ITU's recommended FEC (G.709 standard), RS (255,239) code with an interleaving depth of 16 is used, resulting in $N_{max\_burst}=N_{max\_frame}=8\times16$ bytes (or 1024 bits). The corresponding burst-error-correcting-period (BECP) of is about 0.1 µs for 10-Gb/s systems (0.025 µs for 40-Gb/s systems). To change the state of polarization at least once during each BECP, the speed of the PSM needs to be greater than about 10 MHz, and greater than about 40 MHz, for 10-Gb/s and 40-Gb/s systems, respectively. In systems where multiple data rates coexist (e.g., a system with 10 Gb/s channels mixed with 40-Gb/s channels), a minimal speed requirement is preferably determined by the highest data rate. The speed requirement can be relaxed when PSMs are distributed in many nodes along the transmission link. The larger the number of the nodes (N), the lower the required minimum speed of each PSM. LiNbO$_3$-based PSMs are capable of polarization scrambling with speeds of up to a few GHz, and may be used in accordance with the invention. Using advanced FEC codes with large burst-error-correction capability, the speed requirements of the PSMs 208 speed may be relaxed.

The performance improvement through the use of distributed PSMs was accessed and is discussed below. The PMD-induced OP assuming idealized or sufficient PMD scrambling which redistributed the link DGD to the original Maxwellian distribution was considered. It was understood that there is a small probability that PMD outages may occur even after the PMD scrambling through N nodes with PSM where the new link DGD is still large enough to cause system outage (or it is still larger than the specific $|\Omega|$). We can write the new OP (after sufficient PMD scrambling, OP$_{sufficient}$) as $$OP_{sufficient}(N)=M\{\overline{\Omega}+[M^{-1}(OP_0)-\overline{\Omega}]\cdot\sqrt{N+1}\}, \qquad (2)$$

where M(x) is the probability of obtaining DGD that is larger than x assuming the DGD is Maxwellian distributed with mean of $\overline{\Omega}$, or $$M(x) = \int_x^{+\infty} \frac{32x^2}{\pi^2\overline{\Omega}^3}\exp\left(-\frac{4x^2}{\pi\overline{\Omega}^2}\right)dx. \qquad (3)$$

Figure 8:
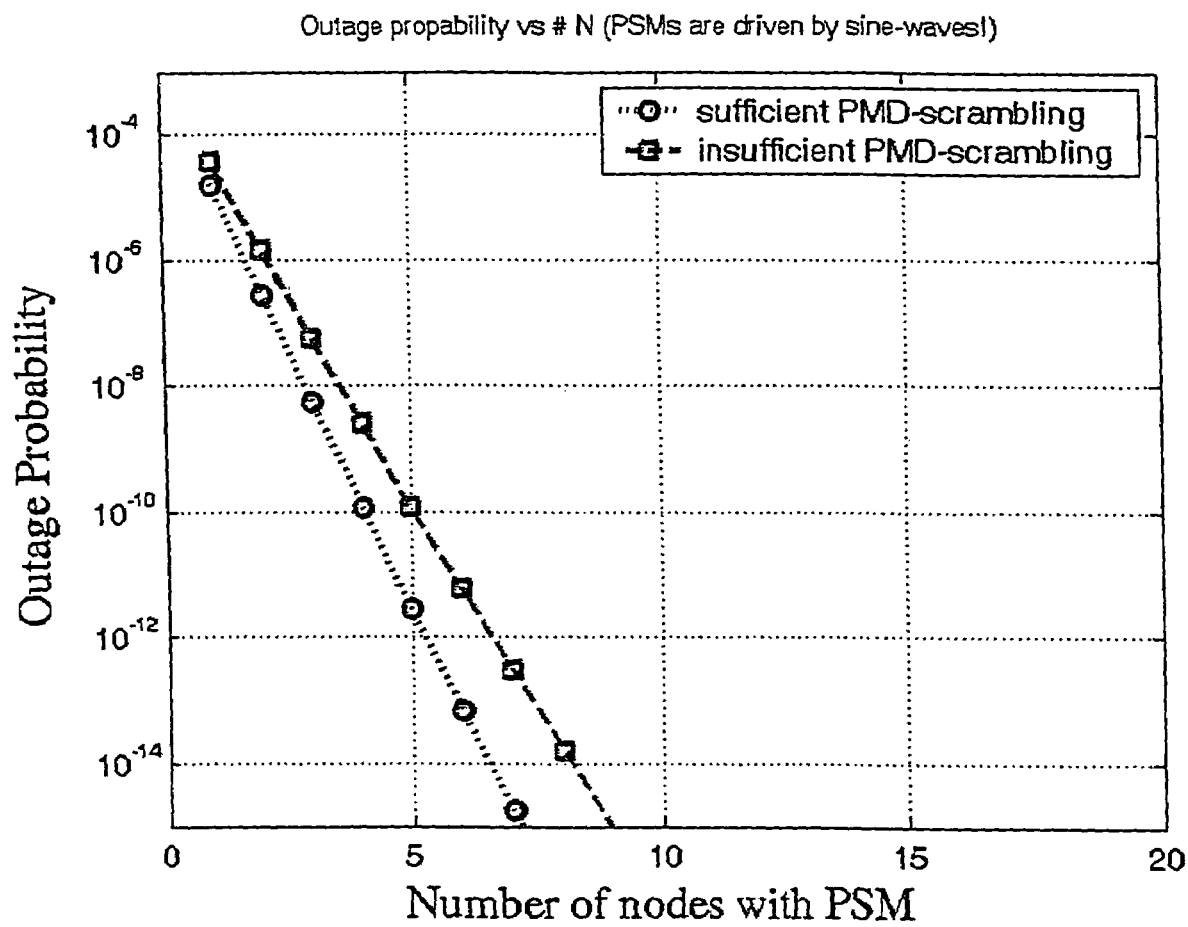
FIG. 8 is a plot showing the outage probability (OP) vs. the number of PSMs assuming idealized PMD scrambling (dotted line) and with insufficient scrambling speed (dashed line)

$M^{-1}(y)$ is the inverse function of M(x). FIG. 8 shows the dependence of the new OP on N for assuming the original OP to be $10^{-3}$ (dotted line for sufficient PMD scrambling). The new OP is substantially reduced with the increase of N. More than ten orders of magnitude of reduction in OP may be achieved with about 10 PSMs.

The performance of the outage prevention under insufficient polarization scrambling speed is of practical interest. The impact of insufficient scrambling speed is the reduction of the effective number of PSMs. Assuming the change of polarization caused by PSMs are sinusoidal and additive, we can extend Eq. (3) to take into consideration the impact as $$OP_{insufficient}(N) \approx OP_{sufficient}(N\cdot p) \qquad (4)$$

where p is the ratio between the actual PSM speed and the required speed. For example, p=0.8 for a PSM with 8-MHz speed in 10-Gb/s systems using standard RS-FEC. The outage prevention performance with p=0.8 is shown with a dashed line in FIG. 8. While insufficient PSM speed degrades the performance, OP can still be significantly reduced from $10^{-3}$ to $<10^{-12}$ with ~10 nodes installing PSM. As can be understood from the above results, the present invention provides for the effective elimination of PMD-induced system outages.

Improvement of PMD Tolerance

Figure 9A:
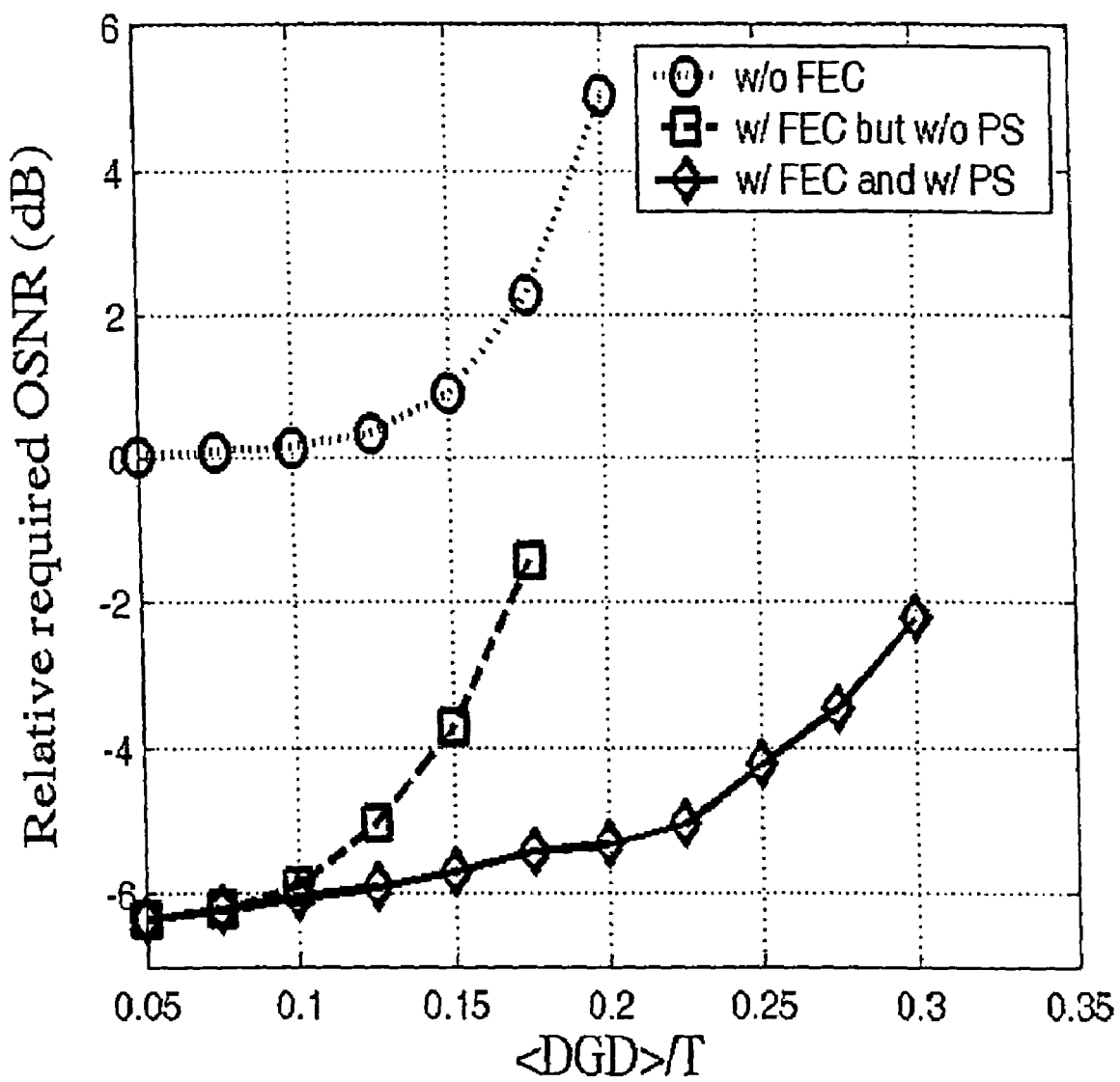
FIGS. 9A-B are plots showing relative required OSNR to achieve BER=$10^{-15}$ as a function of PMD in NRZ-OOK (left) and NRZ-DPSK (right) systems without FEC (circles), with FEC and no PSMs (squares), and with FEC and PSMs (diamonds)
Figure 9B:
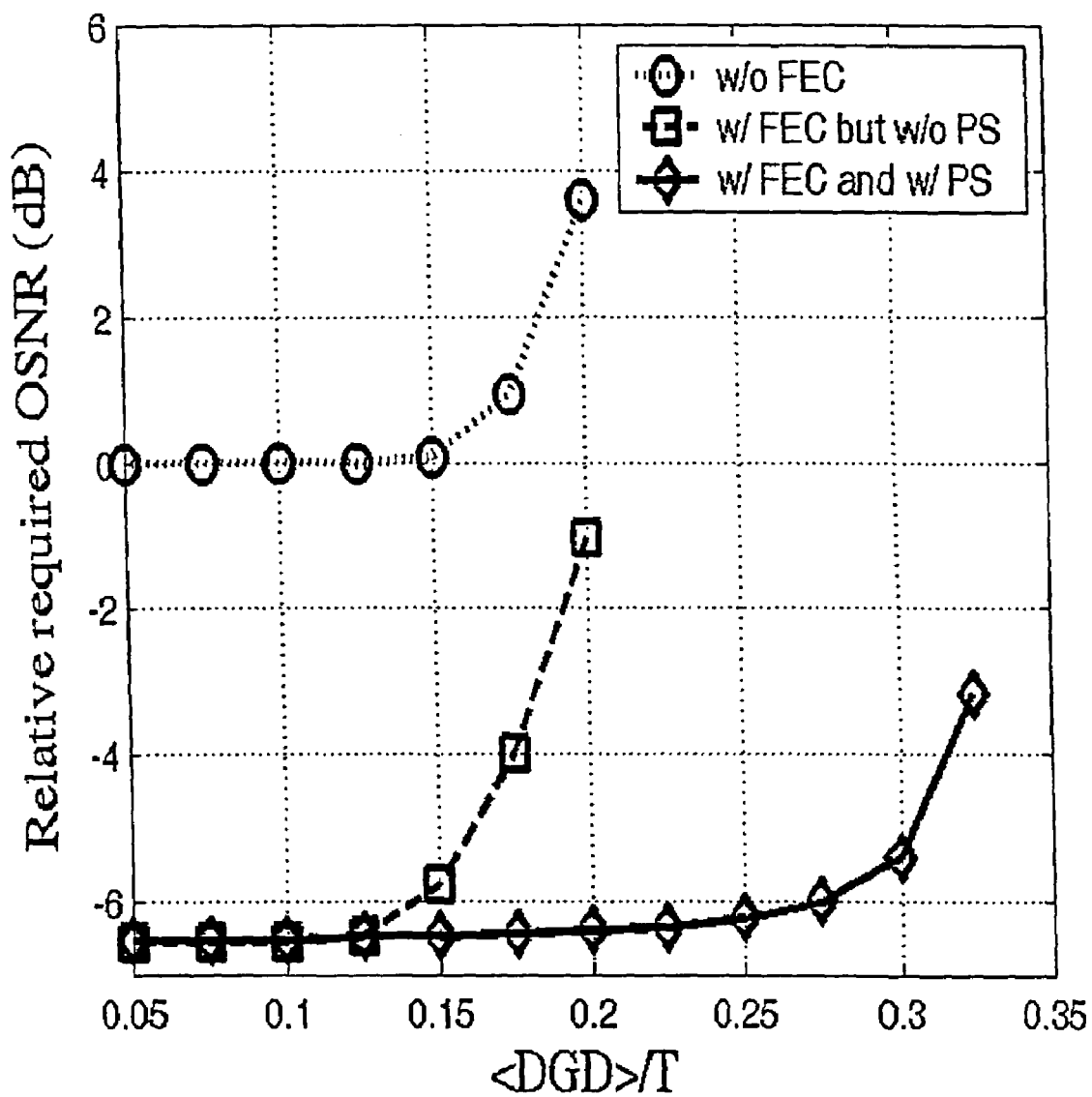
Figure 10:
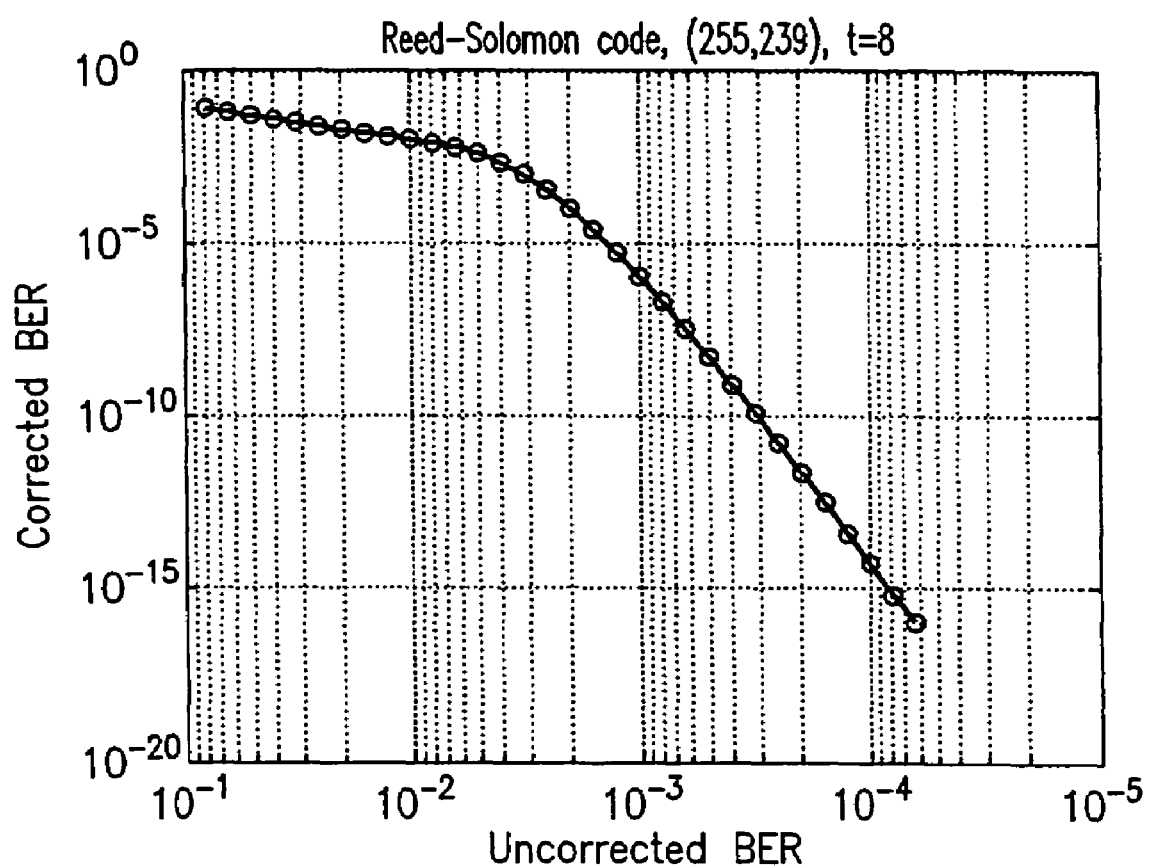
FIG. 10 is a plot showing the dependence of corrected BER (by FEC) on uncorrected BER.

The dependence of the OSNR penalty on PMD is important in evaluating the system tolerance to PMD. FIGS. 9A-B show the relative required OSNR (as compared to that without FEC and without PMD) for achieving a BER of $10^{-15}$ as a function of mean PMD in non-return-to-zero (NRZ) on-off-keyed (OOK) and differential phase-shift-keying (DPSK) transmission systems, respectively. When no FEC is used, the decision threshold and phase are optimized on a bit-by-bit basis or optimized for each case of instant PMD, assuming the PMD is slow varying and the receiver can track the change. An OSNR penalty of 2 dB occurs as the mean system DGD reaches about 17% of the bit period (T). When RS-FEC is used, the decision threshold and phase are optimized on a frame-by-frame basis for each mean PMD. FEC provides about a 6.5 dB improvement over the OSNR requirement. With the increase of PMD, there is substantial difference in PMD tolerance between the cases without and with PSMs. The PMD tolerance (at 2-dB penalty) of the NRZ-OOK system with FEC and PSMs is about 0.24T, about 70% larger than that with FEC but without PSMs. When RS-FEC is used in the NRZ-DPSK system, the PMD tolerances are about 0.17T and about 0.31T without and with distributed PSMs, respectively. The use of distributed PSMs almost doubles the PMD tolerance in systems with FEC. It is noted that such performance improvement cannot be achieved by simply putting a PSM at the transmitter, which cannot avoid "bad" PMDs. Also the PMD tolerance with FEC but without PSMs is smaller than without FEC. This is because of the "nonlinear" dependence of the corrected BER (by FEC) on the uncorrected BER, which normally results in a much larger increase in the corrected BER when the uncorrected BER, is only slightly increased (due to PMD), as shown in FIG. 10. It is thus very beneficial to take the advantage offered by PSMs in systems in which FEC is implemented.

PMD tolerance can be further increased when more powerful FEC codes (i.e. those having a higher uncorrected BER threshold than RS-FEC for a given corrected BER) are used with the present invention, providing the criteria for sufficient PMD scrambling is met. It can be understood by those skilled in the art that the present invention is applicable to systems and transmission methods employing various FEC codes including but not limited to Reed-Solomon codes, concatenated block codes, convolutional codes and codes with various interleaved depth.

In addition, the present invention is also applicable to systems employing NRZ or return-to-zero (RZ) signal formatting, and/or OOK, DPSK, differential quadrature-phase-shift-keying (DQPSK) modulation formatting, or the like.

Additionally, the tolerance to PDL and PDG can be significantly improved with the use of PSMs in systems with FEC. As discussed above with regard to PMD mitigation, the present invention is effective in substantially reducing the PDL and PDG induced outages by quickly redistributing the PDL and PDG to allow FEC to correct transmission errors, substantially reducing outage probability.

Preferably the PSM speed (i.e. the frequency of the sinusoidal drive signals) is above about BR/(FEC-BECL×N) (e.g., 2 MHz for a 10 Gb/s system or 8 MHz for a 40 Gb/s system with, 5 nodes with one or more PSMs and ITU G.709 recommended RS-FEC).

We note that polarization scrambler modules according to the invention also scramble the phases of the signal bits, and polarization scrambling with very high speed (comparable to the data rate, BR) may cause large signal spectrum broadening (e.g., about two times the spectrum of the transmitted signal) and penalty. Preferably the PSM speed is below about BR/N (i.e. 1 GHz for a 10 Gb/s system or 4 GHz for 40 Gb/s system with 10 nodes).

To take advantage of the FEC correction capability, it is desirable to limit the scrambling speed to below about BR/(8×ID), where ID is the interleaving depth of the FEC used in the system (note: 8 is the ratio between a byte (on which FEC processes data) and bit). For example, ITU Standard G.709 (ITU-T Recommendation G.709/Y.1331, "Interfaces for the optical transport network," Feb., 2001) recommends ID=16. So for a 40 Gb/s system, the driver frequency is preferably less than about 300 MHz.

In summary the preferred driver frequency is between about BR/(FEC-BECL×N) and the lesser of about BR/(8×ID) and BR/N.

Additionally, it can be appreciated by those skilled in the art that one advantage of the present invention over PMDC is that the present invention does not require polarization monitoring and feedback control, and can operate in a set-and-forget mode.

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims.

We claim:

1. A polarization scrambler apparatus for use in at least one of N nodes of an optical communication system for transmitting optical signals using forward error correction, comprising:
   M polarization controllers; and
   drive circuitry adapted to drive the M polarization controllers at at least one of a plurality of frequencies $f_1 \ldots f_M$ wherein:
   $BR/(ID \times 8) \geq f_1 \geq f_2 \ldots \geq f_M$
   $f_1 \geq BR/(BECL \times N)$; and
   wherein BR is the highest bit rate of the optical signal, BECL is a maximum burst error correction length of forward error correction used in the optical communication system, and ID is the interleaving depth of the forward error correction used in the optical communication system.

2. The apparatus of claim 1 wherein at least two of the plurality of frequencies $f_1 \ldots f_M$ are not equal.

3. The apparatus of claim 2 wherein the at least two different frequencies are relatively prime.

4. The apparatus of claim 1 wherein the polarization controller comprises a waveplate.

5. The apparatus of claim 4 wherein the waveplate has fixed slow and fast axes.

6. The apparatus of claim 5 wherein the polarization controller is driven using a frequency such that the difference between the optical phases of the two principle states of polarization of the waveplate is varied between zero and π.

7. The apparatus of claim 4 wherein the waveplate has rotatable slow and fast axes such that the orientation of the axes can be controlled.

8. The apparatus of claim 7 wherein the rotation of the slow and fast axes are controlled using a drive signal.

9. The apparatus of claim 7 wherein the slow and fast axes are rotated by greater than 90°.

10. The apparatus of claim 4 wherein the waveplate has rotatable slow and fast axes and adjustable phase delay between the two principle states of polarization of the waveplate.

11. The apparatus of claim 10 wherein the rotation of the slow and fast axes are controlled using a drive signal.

12. The apparatus of claim 10 wherein the waveplate is driven using a frequency such that the difference between the optical phases of the two principle states of polarization of the waveplate is varied between zero and $\pi$.

13. The apparatus of claim 11 wherein the slow and fast axes are rotated by greater than 90°.

14. The apparatus of claim 1 wherein the drive circuitry generates one or more oscillatory drive signals at one or more of the plurality of frequencies $f_1$-$f_M$, to drive the M polarization controllers.

15. An optical communications method for use in at least one of N nodes of an optical communication system using forward error correction to transmit optical signals comprising:
driving M polarization controllers at at least one of a plurality of frequencies $f_1$-$f_M$ such that:
$BR/(ID \times 8) \geq f_1 \geq f_2 \ldots \geq f_M$; and
$f_1 \geq BR/(BECL \times N)$; and
wherein BR is the highest bit rate of the optical signal, BECL is a maximum burst error correction length of forward error correction used in the optical communication system, and ID is the interleaving depth of the forward error correction used in the optical communication system.

16. The method of claim 15 wherein at least two of the plurality of frequencies $f_1 \ldots f_M$ are not equal.

17. The method of claim 16 wherein the at least two frequencies are relatively prime.

18. The method of claim 15 wherein the polarization controller comprises a waveplate.

19. The method of claim 18 wherein the waveplate has fixed slow and fast axes.

20. The method of claim 19 wherein the polarization controller is driven using a frequency such that the difference between the optical phases of the two principle states of polarization of the waveplate is varied between zero and $\pi$.

21. The method of claim 18 wherein the waveplate has rotatable slow and fast axes such that the orientation of the axes can be controlled.

22. The method of claim 21 wherein the rotation of the slow and fast axes are controlled using a drive signal.

23. The method of claim 21 wherein the slow and fast axes are rotated by greater than 90°.

24. The method of claim 18 wherein the waveplate has rotatable slow and fast axes and adjustable phase delay between the two principle states of polarization of the waveplate.

25. The method claim 24 wherein the rotation of the slow and fast axes are controlled using a drive signal.

26. The method of claim 24 wherein the waveplate is driven using a frequency such that the difference between the optical phases of the two principle states of polarization of the waveplate is varied between zero and $\pi$.

27. The method of claim 24 wherein the slow and fast axes are rotated by greater than 90°.

28. An optical communication system for transmitting optical signals using forward error correction, comprising:
a plurality of polarization scrambler modules distributed among a plurality of N nodes of the optical communication system, the polarization scrambler modules including:
M polarization controllers; and
drive circuitry for generating drive signals having frequencies $f_1$-$f_M$ to drive the M polarization controllers wherein:
$BR/(ID \times 8) \geq f_1 \geq f_2 \ldots \geq f_M$;
$f_1 \geq BR/(BECL \times N)$; and
wherein BR is the highest bit rate of the optical signal, BECL is a maximum burst error correction length of forward error correction used in the optical communication system, and ID is the interleaving depth of the forward error correction used in the optical communication system.

29. An apparatus for polarization scrambling at one or more of N nodes of an optical communication system using forward error correction, comprising:
a plurality of M polarization controller means; and
means for driving the polarization controller means at a plurality of frequencies $f_1$-$f_M$ such that:
$BR/(ID \times 8) \geq f_1 \geq f_2 \ldots \geq f_M$; and
$f_1 \geq BR/(BECL \times N)$; and
wherein BR is the highest bit rate of the optical signal, BECL is a maximum burst error correction length of forward error correction used in the optical communication system, and ID is the interleaving depth of the forward error correction used in the optical communication system.

* * * * *